United States Patent [19]

Kring et al.

[11] 3,869,539

[45] Mar. 4, 1975

[54] PREPARATIONS CONTAINING FAT-SOLUBLE VITAMINS IN DRY, PARTICULATE, FREE-FLOWING FORM DISPERSIBLE IN COLD WATER AND METHOD OF PRODUCING SUCH PREPARATIONS

[75] Inventors: Peder Lund Kring, Virum; Jørgen Lund, Herlev, both of Denmark

[73] Assignee: A/S Ferrosan, Copenhagen, Denmark

[22] Filed: Feb. 26, 1973

[21] Appl. No.: 335,525

Related U.S. Application Data

[63] Continuation of Ser. No. 73,191, Sept. 17, 1970, abandoned, which is a continuation of Ser. No. 684,501, Nov. 20, 1967, abandoned.

[30] Foreign Application Priority Data

Dec. 1, 1966    Denmark ............................. 6230/66

[52] U.S. Cl.................. 424/236, 424/284, 424/344
[51] Int. Cl........................................... A61k 27/00
[58] Field of Search...................... 424/236, 284, 344

[56] References Cited
UNITED STATES PATENTS

| | | | |
|---|---|---|---|
| 2,413,815 | 1/1947 | Epstein | 260/117 X |
| 2,992,213 | 7/1961 | Gates, Jr. et al. | 260/117 |
| 3,138,532 | 6/1964 | Aiello et al. | 424/344 |
| 3,143,475 | 8/1964 | Koff et al. | 424/236 |

OTHER PUBLICATIONS

A. G. Ward, Recent Progress in Gelatin Research, Scientific and Technical Surveys No. 31; The British Food Mfg. Indust. Research Association.

*Primary Examiner*—Albert T. Meyers
*Assistant Examiner*—Norman A. Drezin
*Attorney, Agent, or Firm*—Wenderoth, Lind & Ponack

[57] ABSTRACT

When producing preparations of fat-soluble vitamins in which the vitamins are dispersed into gelatinous particles by the known processes for this purpose, the gelatine used is partially decomposed by treatment for 0.1 – 2 hours with 0.05 to 0.5 g. equivalent of hydrochloric or sulphuric acid or sodium or ammonium hydroxide per 100 g of gelatine; the so treated product is neutralized with the same bases or acids as the case may be, and the vitamin is dispersed therein, to form particles of 1–5 $\mu$ diameter. The gelatine is divided to particles 50–400 $\mu$ in diameter and produced in particulate form in known manner. Because of the pretreatment of the gelatine, the finished and dried product is cold water-soluble even at 0°–7° C.

3 Claims, No Drawings

PREPARATIONS CONTAINING FAT-SOLUBLE VITAMINS IN DRY, PARTICULATE, FREE-FLOWING FORM DISPERSIBLE IN COLD WATER AND METHOD OF PRODUCING SUCH PREPARATIONS

This is a continuation of application Ser. No. 73,191, filed Sept. 17, 1970, now abandoned, which in turn is a continuation application of Ser. No. 684,501, filed Nov. 20, 1967, now abandoned.

It is known to incorporate fat-soluble vitamins in small gelatine-containing particles to form dry particulate free-flowing preparations. In these preparations the vitamins which are sensitive to oxidation, especially A-, D- and E-vitamins, are effectively protected against destruction under usual storage conditions. Such dry products are extensively used for vitaminizing fodder and as a constituent in pharmaceutical preparations for human and veterinary use, for instance in the form of tablets or capsules.

The above named dry products consist of spherical particles which are normally 50–500 $\mu$ in diameter and contain the fat-soluble vitamin uniformly and finely distributed in oil drops of the order of 5 $\mu$ in diameter encapsuled in the solid gelatinous mass of which the dry product consists.

The present invention relates to products of this kind. Products of this kind have been produced in various manners, such as by adding the fat-soluble vitamin or vitamins or concentrates of such vitamins in an oil or in an oil-soluble solvent, to a hot liquid solution of gelatine which may or may not contain a sugar or a sugar alcohol. The vitamin or the vitamin solution is then emulsified in the gelatine solution so as to obtain an emulsion of the type oil-in-water, in which the oil drops have a diameter of the order mentioned above, or 1–5 $\mu$. This emulsion, which is liquid at the temperature at which it is produced, solidifies owing to the content of gelatine to form a solid gel when cooled. In order to obtain particles of the desired diameter, the emulsion is then subjected to a comminution process which may consist by way of example in that it is atomized to small air-borne drops which are caught in some medium capable of keeping the drops apart, i.e., to prevent coalescence to form greater drops. The catching medium may be solid or liquid and may consist of oil, dried starch, calcium stearate, a silicate or a lower alcohol or hexane. Another method consists in finely dividing the hot emulsion which in the following will be termed the primary emulsion, by pouring it into a neutral oil with stirring, whereby another emulsion of the type water-in-oil forms, in which the dispersed phase consists of particles having diameters of 50–600 $\mu$ of the primary emulsion. By cooling the said new emulsion, the gelatinous particles solidify to form small spheres which are now able to stand a treatment by which the medium keeping the particles apart is removed by means of a suitable solvent or by siftening or screening or filtration, and also are able to stand that the original water contents of the particles are reduced to a low value by drying.

Products of this kind or those produced by means of these processes are not, however, soluble or dispersible in cold water. In view of the fact that a product soluble in cold water is desirable for many purposes, such as for vitaminizing drinking water for cattle or other domestic animals and for vitaminisation of milk and vitaminisation of edible products intended for being dissolved or dispersed in water prior to administration, the invention has for its purpose the devising of such products dispersible in cold water and a method of producing such products.

It is known that such products can be achieved by using methods of the above named type, provided that particular conditions are used, said conditions consisting in employing an aqueous gelatine solution treated with ascorbic acid, iso-ascorbic acid, mixtures of these acids with citric acid or with a mixture of citric acid and sorbose. The treatment is carried out at a temperature of 65°–80° C and takes 4–12 hours, after which it is discontinued by adjusting pH by means of a buffer such as sodium citrate. This treatment, however, suffers from various drawbacks. Thus, it requires a considerable amount of the said organic acids and buffers which are expensive and constitute an undesirable dead weight. In consequence thereof, and of the considerable duration of the treatments, the preparation is made relatively expensive.

The present method aims at a method for producing preparations containing fat-soluble vitamins in dry, particulate, free-flowing form, dispersible in cold water, by which method these drawbacks are avoided. Furthermore, the invention has for its object the preparations hereby produced.

The method according to the invention is characteristic in that the fat-soluble vitamin or vitamins with or without antioxidants are incorporated in finely dispersed form in a mass of gelatine partially decomposed with a base or an inorganic acid and neutralized to a pH-value between 4.5 and 7, to which mass there may or may not have been added a sugar or a sugar alcohol and probably other constituents.

Hereby the purpose aimed at is achieved. Thus, it has been found that by treating gelatine for a much shorter period with a much smaller weight of inexpensive bases and inorganic acids, a gelatine product is obtained which after neutralization to pH 4.5 – 7 and incorporation therein of the fat-soluble vitamin or vitamins in finely dispersed condition, with or without antioxidants, and drying of the particles in particulate form, fully satisfies the condition of being soluble or dispersible in cold water. The amount of base or inorganic acid used for the treatment of the gelatine may amount to 0.05 – 0.5 gram equivalents per 100 g of gelatine, but according to a particularly advantageous modification of the invention, the gelatine used is treated with an amount of base or inorganic acid within the limits 0.1 to 0.3 gram equivalents per 100 g of gelatine in connection with a simple inorganic acid or base for the neutralisation. Consequently, the amount of neutralisation product remaining in the gelatine is decreased, which applies thereby also to the dead weight of indifferent or unimportant substances present in the finished preparation.

Generally, a plastifying substance, such as glucose syrup or a sugar or sugar alcohol is added to the gelatine solution treated with base or inorganic acid and neutralized, and finally, when the solution is still hot, the fat-soluble vitamin or vitamins are added with powerful stirring or emulsifying, so that an emulsion of the type oil-in-water and containing the oil in the form of drops of the diameter 1–5$\mu$ is obtained. In connection herewith, one or more antioxidants may be added, such as butyl hydroxy anisole, butyl hydroxy toluene, tocopherol, higher or lower esters of gallic acid or ethoxyquine. The hot liquid emulsion thereby obtained is finely divided as before mentioned, for instance by atomization or spraying and catching in a separating agent or by emulsifying in a neutral oil. The fine division should be carried to produce particles of the magnitude of 50–600 $\mu$, and should be followed by cooling to solidify the gelatinous particles, and by an operation by means of which this separation agent or the neutral oil is removed. Finally, the product must be dried to bring the contents of water down to a suitable low value, at which the preparation is stable to storage under normal storage temperatures without losing the particular form or the capability of flowing freely.

In order to be sure that the preparation is soluble or dispersible in water, by which term it is meant that by treating the preparation with water at a suitable temperature, the vitamin containing phase must enter into emulsion in the water, it is necessary that the protecting mass surrounding the drops of vitamins, in casu gelatine or the decomposition product thereof, can be easily and rapidly dissolved in the water or in the aqueous phase of milk or edible product for the vitaminization of which the preparation is intended. The temperature at which this purpose can be achieved of course depends on such factors as the amount and quality of the gelatine used. On the other hand, it will not be possible to dissolve gelatine which has not been subjected to a specific pre-treatment in cold water, i.e., in water or milk at the temperatures at which they are available, without the necessity of establishing any heating. The invention consists in the finding that by the pre-treatment with bases or inorganic acids described above, such partial decomposition of the gelatine can be obtained that it dissolves when the finished product is stirred with cold water.

The treatment may take place at temperatures between 40° and 95° C, but the preferred temperature is between 50° and 85° C. It is important that the treatment of the gelatine can be carried out at this temperature during very short time.

The temperature at which the preparation can be dissolved in water or in aqueous phase will normally increase with the content of gelatine in the preparation. On the other hand, there must be a certain minimum of gelatine to enable the finely dispersed emulsion to be converted into a suitable particulate product. Thus, the content of gelatine must normally be between 10% and 60% based on the finished product, preferably between 15% and 30%.

It is possible to use gelatine having higher or lower bloom-number, but gelatine having a high bloom-number normally gives rise to a finished product with a rather high dissolving temperature, for which reason such a gelatine calls for a more powerful treatment with base or inorganic acid in order to achieve a cold water-soluble product than a gelatine having a lower bloom-number. Further, the general rule is that the greater the amount of base or inorganic acid used in the treatment, the lower the dissolving temperature of the finished product will be. If too great amounts of base or inorganic acid are used, it is generally not possible to avoid the result that the gelatine loses its capability of gelling, whereby the fabrication of a particulate product becomes impossible.

In connection with the method according to the invention, a low dissolving temperature of the finished product can be achieved by means of a small amount of base or acid.

Thus, according to the invention, the proportion of base or inorganic acid used for the treatment of the gelatine is always within the limit 0.05 to 0.5 gram equivalent per 100 g of gelatine, and it is important that it is almost always preferable to treat within the lower part of this interval, i.e., between 0.1 and 0.3 gram equivalent per 100 g gelatine. Using these proportions, the treatment can be completed within 0.1 to 4 hours, but the temperature and the concentration of the base or acid must then be mutually adjusted, preferably in such manner that the gelatine product, by means of which a finished product having the desired low dissolving temperature is obtained is prepared during 0.15 to 1 hour. In the neutralisation to a pH-value between 4.5 and 7, which follows thereupon, such bases as sodium hydroxide or ammonium hydroxide can be used if the treatment has been carried out by means of inorganic acid, and simple inorganic acids such as sulphuric acid or hydrochloric acid, can be used if the treatment has been carried out by means of a base.

In the following, the invention will be illustrated by means of a number of examples.

EXAMPLE 1

50 g of gelatine (130 bloom) are dissolved with stirring in the same amount of distilled water by heating to about 60° C. After this, 5.0 g of concentrated sulphuric acid (96%) are added, and the solution is left to stand with stirring at a temperature between 78° and 84° C for 30 minutes, after which 3.75 g of sodium hydroxide dissolved in the same amount of water are added; the pH-value of the gelatinous solution is now 5.8. To the hot solution of gelatine are added 200 g glucose syrup (80%), and then under powerful stirring, 63 g of A-vitamin palmitate (1.6 mill. i.u. A/g), in which 5 g of butyl hydroxy toluene has been previously dissolved. After this the hot emulsion, in which A-vitamin oil drops have a diameter of 1–5 $\mu$, is poured with stirring into 300 g castor oil, which has been heated to 55° C. The double emulsion (w/o) is stirred until the gelatinous particles have achieved a diameter of about 100–400$\mu$, and the stirring is then continued with less power and cooling, until the temperature has decreased to about 10° C. The cooled double emulsion is washed four times with cold ethanol (96%), whereby the castor oil and a part of the water from the gelatinous particles are removed. The product is then dried at 22° C for 1 day and then at 50° C for 2 hours.

The product has a content of 345,000 i.u. A vitamin per gram and is dissolvable in water even at 4° C, whereby the A vitamin disperses as a fine emulsion without leaving perceptible non-dissolved residues. The aqueous emulsion has no inconvenient aroma or taste.

EXAMPLE 2

25 g gelatine (70 bloom) are dissolved in 35 ml of 0.5 N sodium hydroxide and kept at 65° C for 15 minutes, after which the solution is neutralised with concentrated sulphuric acid to pH 5.5. 135 g of glucose syrup are added to the hot gelatine solution together with 25 g of A-vitamin palmitate in which 3 g of butyl hydroxy toluene has been dissolved.

The primary emulsion thus obtained is poured with stirring into 250 g castor oil which has been heated to 50° C. After cooling to 10° C, the double emulsion is washed with ethanol as in example 1. The finished dry product contains 258,000 i.u. vitamin A per gram, and dissolves in water or milk at 0°–3° C without leaving non-soluble remains, and without giving rise to inconvenient odor or taste.

EXAMPLE 3

50 g gelatine (130 bloom) are dissolved in 45 ml water at 60° C, after which 2.6 g of sodium hydroxide dissolved in the same amount of water are added; the mixture is kept at 58°–62° C for 30 minutes, after which it is neutralized with 2.8 g of concentrated sulphuric acid to pH 5.6. To the hot gelatine solution is added 200 g glucose syrup (80%) and a hot mixture of 58 g A-vitamin palmitate (1.6 mill. i.u. vitamin A per g), 1.6 g $D_3$-resin (22 mill. i.u. $D_3$-vitamin per g), and 5 g butyl hydroxy toluene.

The hot primary emulsion thus obtained, in which the drops of A- and D-vitamin oil have a diameter of 1–5 $\mu$, is now poured with stirring into 300 g castor oil heated to 55° C. The double emulsion formed is stirred until the gelatinous particles attain a diameter of about 100–400 $\mu$, and stirring is continued at a lower rate with cooling until the temperature has decreased to about 10° C. The cooled double-emulsion is washed four times with cold ethanol (96%), whereby the castor oil is removed. The product is dried at 22° C for 1 day and then at 50° C for 2 hours.

The product contained 330,000 i.u. vitamin A per gram and 112,000 i.u. $D_3$-vitamin per gram, and is dissoluble in water at 4°–7° C. Hereby the fat-soluble vitamins disperse as a fine emulsion which acquires a milky appearance without leaving perceptible undissolved remains. The aqueous emulsion has no disagreeable odor or taste.

EXAMPLE 4

25 g gelatine (70 bloom) are dissolved in 35 ml 0.5-N sodium hydroxide and kept at 65° C for 15 minutes, after which the solution is neutralized with concentrated sulphuric acid to pH 5.5. To the hot gelatine solution are added 135 g glucose syrup and 29 g A-vitamin palmitate, in which 3 g of butyl hydroxy toluene are dissolved.

This primary emulsion is treated in the same way as in the previous example. The finished dry product contains 258,000 i.u. vitamin A per g, and dissolves at 0°–3° C without leaving indissoluble remains and without giving rise to disagreeable odor or taste.

What is claimed is:

1. In a process for producing cold water dispersible preparations containing vitamins A, D or E, which comprises mixing the vitamin with a gelatine product and plasticizer, finely dividing the resultant mixture, solidifying the finely divided product and drying the solidified product, the improvement wherein the gelatine product is prepared by partially decomposing gelatine by treating the gelatine for 0.15–1 hour at 40°–95° C with 0.1–0.3 gram equivalent of sodium hydroxide per 100 grams of gelatine and neutralizing the partially decomposed gelatine to a pH of 4.5–7.0 with hydrochloric acid or sulfuric acid, and the vitamin is mixed with 10–60% by weight of gelatine product, based on the weight of the dispersible preparation.

2. The process according to claim 1, wherein 80% glucose syrup is added to the partially decomposed gelatine immediately prior to incorporation of the vitamin therein.

3. The process according to claim 1, wherein an effective amount of an antioxidant selected from the group consisting of butyl hydroxy anisole, butyl hydroxy toluene and ethoxyquine is added to the vitamin prior to incorporation into the partially decomposed gelatine.

* * * * *